United States Patent [19]
Hofstetter et al.

[11] Patent Number: 5,838,572
[45] Date of Patent: Nov. 17, 1998

[54] REAL-TIME INTERRUPT DRIVEN PC CONTROL SYSTEM FOR A STORAGE AND RETRIEVAL MACHINE

[75] Inventors: Robert C. Hofstetter; Wesley S. Crucius, both of Brookfield, Wis.

[73] Assignee: HK Systems, Inc., New Berlin, Wis.

[21] Appl. No.: 835,215

[22] Filed: Nov. 22, 1995

Related U.S. Application Data

[63] Continuation of Ser. No. 42,241, Apr. 2, 1993, abandoned.

[51] Int. Cl.⁶ .................................................... G06F 17/00
[52] U.S. Cl. ............................... 364/478.01; 364/474.11; 364/479.05
[58] Field of Search .................................. 364/192, 478, 364/513, 474.11; 414/273

[56] References Cited

U.S. PATENT DOCUMENTS

| | | | |
|---|---|---|---|
| 3,638,575 | 2/1972 | Griner . | |
| 4,232,370 | 11/1980 | Tapley | 364/478 |
| 4,415,975 | 11/1983 | Burt | 364/478 X |
| 4,712,964 | 12/1987 | Van Elten et al. | 414/281 |
| 4,722,653 | 2/1988 | Williams et all | 414/222 |
| 4,756,657 | 7/1988 | Kinney | 414/281 |
| 4,773,807 | 9/1988 | Kroll et al. | 414/282 |
| 4,878,002 | 10/1989 | Heatzig et al. | 318/568.2 |
| 4,897,587 | 1/1990 | DiGiulio et al. | 364/174 X |
| 4,928,245 | 5/1990 | Moy et al. | 364/513 |
| 4,972,277 | 11/1990 | Sills et al. | 360/92 |
| 4,984,106 | 1/1991 | Herger et al. | 360/92 |
| 5,044,859 | 9/1991 | Sorensen et al. | 414/273 |
| 5,147,176 | 9/1992 | Stolzer et al. | 364/478 X |
| 5,166,872 | 11/1992 | Weaver et al. | 364/133 |
| 5,216,618 | 6/1993 | Arita et al. | 364/478 |
| 5,379,229 | 1/1995 | Parsons et al. | 364/478 |

FOREIGN PATENT DOCUMENTS

| | | |
|---|---|---|
| 0 241 189 | 10/1987 | European Pat. Off. . |
| 0 329 642 | 8/1989 | European Pat. Off. . |
| 1 547 586 | 9/1967 | France . |
| 2 630 412 | 10/1989 | France . |
| 1 235 560 | 9/1967 | Germany . |
| 2 002 749 | 7/1971 | Germany . |
| 2 313 429 | 6/1974 | Germany . |
| 2 130 186 | 5/1984 | United Kingdom . |

*Primary Examiner*—Paul P. Gordon
*Assistant Examiner*—Sheela S. Rao
*Attorney, Agent, or Firm*—Nilles & Nilles, S.C.

[57] ABSTRACT

An event-driven control system controls movement of a base and carriage of a storage and retrieval machine. The control system is microprocessor-based and includes a motion controller, a machine control task, an input/output interface, an input/output task, and a microprocessor that executes the machine control task and the input/output task. In operation, a plurality of interrupts is issued to the machine control task in response to events which occur in an operating environment of the storage and retrieval machine. To respond to the interrupts, at least one subroutine in response to the reception of each interrupt. The execution of the subroutines controls movement of the base and the carriage of the storage and retrieval machine. Movement of the base and the carriage of the storage and retrieval machine (1) is substantially entirely controlled by issuing and responding to the interrupts as different events occur in the operating environment that cause the interrupts to be issued. As a result, the storage and retrieval machine is controlled in a manner which is substantially free of polling by the machine control task of the input/output interface and the motion controller for status information. Since the control system does not have to constantly monitor the status of input/output information from the input/output interface and the status of motion control information from the motion controller, the efficiency of the control system is greatly improved.

22 Claims, 10 Drawing Sheets

REAL-TIME INTERRUPT DRIVEN PC CONTROL SYSTEM FOR A STORAGE AND RETRIEVAL MACHINE

This application is a continuation of U.S. Ser. No. 08/042,241, filed Apr. 2, 1993, now abandoned.

FIELD OF THE INVENTION

The invention relates generally to the control of storage and retrieval machines utilized in automated storage and retrieval systems.

BACKGROUND OF THE INVENTION

Known storage and retrieval systems include a storage and retrieval machine (SRM) comprising a horizontally moveable mast, a carriage movable vertically relative to the mast, a shuttle moveable horizontally relative to the carriage for engaging or releasing an item (such as a container, pallet, tote, or bin) to be conveyed, and motion controllers and motors for moving the components relative to one another. The mast moves relative to a staging or storage rack having many storage locations and is used to convey the item to or from a storage location. Each storage location on the staging rack can be considered to have a unique vertical and horizontal address. The staging rack has a variable number of storage locations on either or both sides of the mast.

There are many types of configurations utilized to control storage and retrieval machines (SRM's).

Typically, the SRM is monitored and controlled using a programmable logic controller (PLC), such as an Allen Bradley PLC 5/15, on the mast, and a higher level computer separate from the mast. The PLC receives commands from the higher level computer, and executes a series of instructions to control the motion controllers and motors.

An SRM typically has the following motions, although additional motions may be required for specific applications: Horizontal Travel (or X Axis), Vertical Travel (or Y Axis), and Shuttle Travel (or Z Axis).

The following is a summary of the traditional types of motion control utilized for the different directions (axes) of travel.

One type of motion control is multi or variable speed motion control utilizing position inputs and/or address target type position feedback to the PLC or microprocessor. The PLC or microprocessor sets discrete outputs to select different speeds (such as creep, slow, medium, full), or it utilizes an analog output to provide a speed reference signal to a motor's drive in order to scale the speed of the motor as a percentage of top speed of the motor. Depending upon the travel distance, the PLC or microprocessor sets the required speed outputs or provides the appropriate speed reference signal to initiate and control motion. The PLC or microprocessor then continually monitors position inputs or a group of inputs used for an addressing or counting scheme (e.g. using sensors and address plates, such as photo electric sensors and reflective strips, to monitor position). If the PLC or microprocessor encounters a new address or position input, it redetermines the travel distance to its destination and adjust its speed outputs/reference accordingly. This sequence continues until the required destination is reached.

Another type of motion control is multi or variable speed motion control utilizing encoder or resolver type feedback to the PLC or microprocessor. A resolver or encoder (a position transducer) is mounted on the back of a motor or somewhere externally of the motor (such that it is located where it can provide position feedback to the PLC or microprocessor) and measures the distance of travel along the axis along which the motor causes movement. This feedback provided by the encoder or resolver is either incremental or absolute. For this type of motion control, the PLC or microprocessor typically utilizes a card which is connected to the encoder or resolver. This card receives the updated position data and maintains it for periodic, controlled use by the PLC or microprocessor. Again, the PLC or microprocessor sets appropriate outputs to select discrete speeds or it provides an analog output to provide a speed reference signal to a motor to initiate and maintain motion. The PLC or microprocessor then continually monitors the position data received and determines the distance to the required destination. If the PLC or microprocessor determines that a speed change is required, it adjusts its speed selection accordingly. This sequence continues until the required destination is reached.

Another type of motion control is multi or variable speed motion control utilizing smart, or servo, (spindle) drive motion controllers and a serial interface. Single or multiple drives or motors can be operated or monitored with one drive controller. In this arrangement, the position (encoder/resolver) feedback is connected directly to the drives' motion controller. Again, this feedback could be either incremental or absolute in nature. In this arrangement, a smart motion controller is in command of the motor's operation. The controller decides, based on maximum values given to it, what speeds, accelerations, and decelerations are to be utilized during a specific motion request. The PLC or microprocessor is acting more as a supervisory type controller instead of doing the speed selection and position monitoring itself. When the PLC or microprocessor is given a command to position to a certain coordinate, it determines where an individual axis must be positioned. Once this is determined, the PLC or microprocessor issues a command over a communications link (such as an RS-232, RS-422, or RS-485 cable) to the appropriate drive's motion controller. Once the motion controller receives the command, the motion controller directs the appropriate motor to the required position and the motion controller (as opposed to the PLC or microprocessor) adjusts and controls speed while doing so. After the PLC or microprocessor issues the position command to the motion controller, the PLC or microprocessor either continually requests status information, or waits (monitoring a communications receive buffer) until a message is received that the requested positioning was accomplished or has failed.

Another type of motion control is multi or variable speed motion control utilizing smart, servo, or spindle drive motion controllers in the PLC's or microprocessor's backplane or chassis. A backplane is a high speed communication bus. Single or multiple drives or motors can be operated and monitored with one PLC or microprocessor. An encoder or resolver is connected directly to the motion controller to provide feedback to the motion controller. The feedback could be either incremental or absolute in nature. Again, in this arrangement, the smart motion controller is in command of the motor's operation. The motion controller decides, based on maximum values given to it, what speeds, accelerations, and decelerations are to be utilized during execution of a specific motion request. The PLC or microprocessor is acting more as a supervisory type controller instead of performing the speed, position, acceleration, and deceleration selections itself. When the PLC or microprocessor is given a command to position a carriage to a certain coordinate, it determines where an individual axis must be positioned. The controller then issues a command, typically through shared memory (dual ported RAM) on the PLC or microprocessor's backplane, to the appropriate drive's motion controller. After the motion controller receives the command, it directs the appropriate motor to the requested position. After the PLC/microprocessor issues the command, it continually requests position information or status from the motion controller to determine whether the requested positioning was accomplished or has failed. The PLC or microprocessor waits until a status indication is received through a memory interface, such as dual ported RAM, indicating the success or failure of the request.

For all these types of motion control, the PLC or microprocessor must monitor command execution sequences in order to carry out a complete command request from a higher level computer. Typically, this is done on some sort of time interval.

A PLC generally updates its I/O status (receiving inputs from or providing outputs to photosensors, limit switches, and relays or solenoids such as those used for energizing motors, etc.) either at the beginning or at the end of scan (execution) time.

A microprocessor utilizes a foreground/background technique in which the I/O status is typically updated during a preset time interval such as 10–20 milliseconds.

Hence, the PLC or microprocessor control software is continually monitoring the I/O status even though it may not have been updated or changed.

In summary, in prior art storage and retrieval systems, a PLC or microprocessor is continually processing information whether it be input/output information, or information from some type of motion controller. This information can be old data or new, updated data.

This prior art type of software control and monitoring can impose undue delays in the processing of new and current events and prevents other software processes or tasks from obtaining CPU time.

SUMMARY OF THE INVENTION

The invention provides a storage and retrieval system comprising a storage and retrieval machine, a computer, specialized computer boards, and application software (including a machine control task, an I/O task, and an SRM task) running in the computer in an interrupt driven, real-time, multi-tasking operating system. A multi-tasking operating system is one wherein several software tasks can be run simultaneously.

This software and hardware configuration allows storage retrieval machine control (performed by the machine control task), I/O monitoring (performed by the I/O task), and drive motion control (performed by the machine control task) to be separated or specialized in order for the I/O task and machine control task to be totally event driven. The demand that the machine control task places on the computer's CPU is minimized.

Because the machine control task is event driven, this task is essentially suspended unless it has an event to act upon. The machine control task does not process events by constantly monitoring the I/O or interfaces with drive motor controllers. The machine control task only processes or requests information when it has been informed that something has changed or occurred.

Other features and advantages of the invention will become apparent to those skilled in the art upon review of the following detailed description, claims, and drawings.

DESCRIPTION OF DRAWINGS

A preferred exemplary embodiment of the invention is illustrated in the accompanying drawings in which like reference numerals represent like parts throughout, and in which.

DESCRIPTION OF THE PREFERRED EMBODIMENT

Shown in the various figures is a storage and retrieval system 12.

Figure 2:
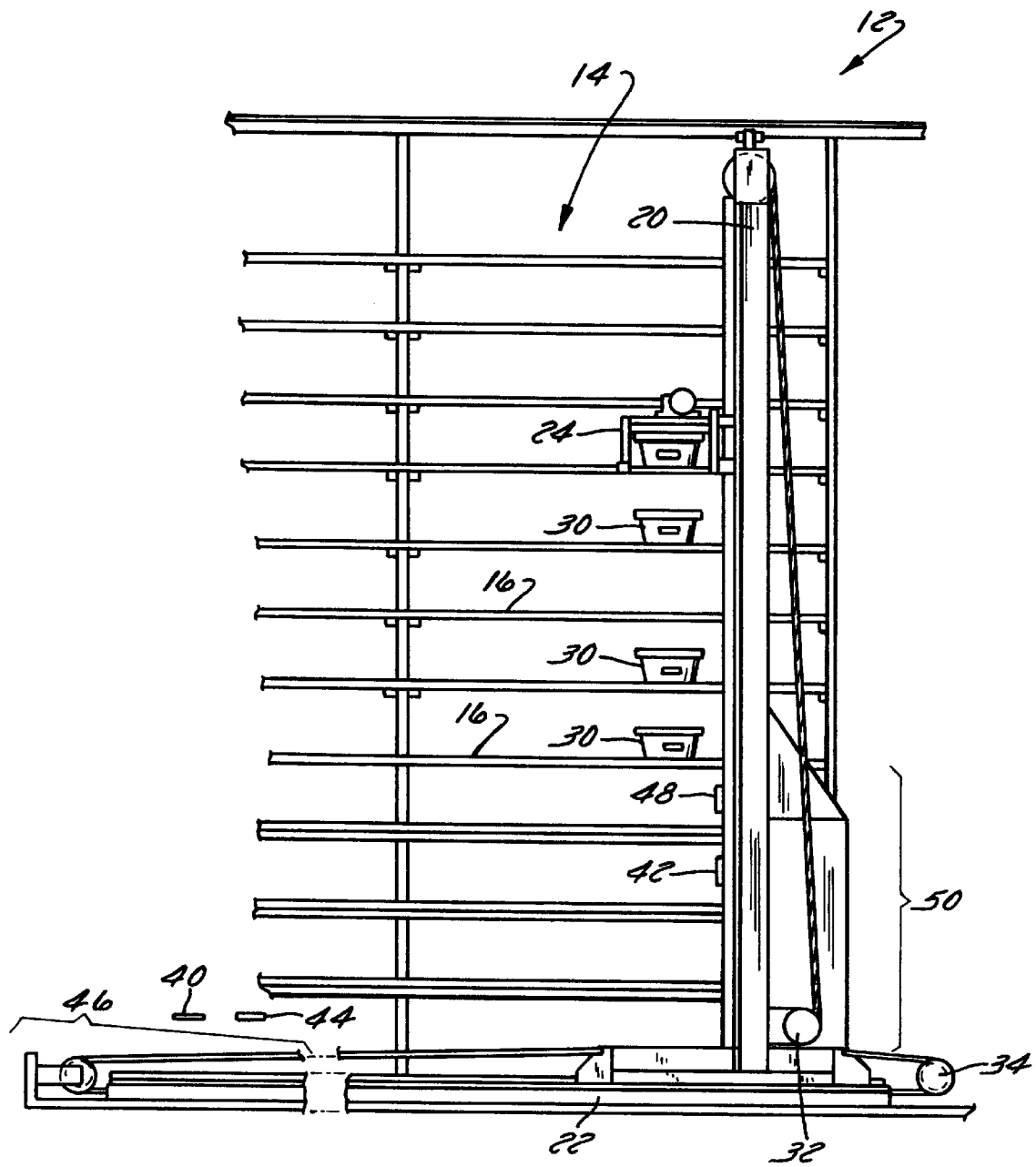
FIG. 2 is an elevational view of a storage and retrieval machine and staging rack included in the storage and retrieval system of FIG. 1.
Figure 3:
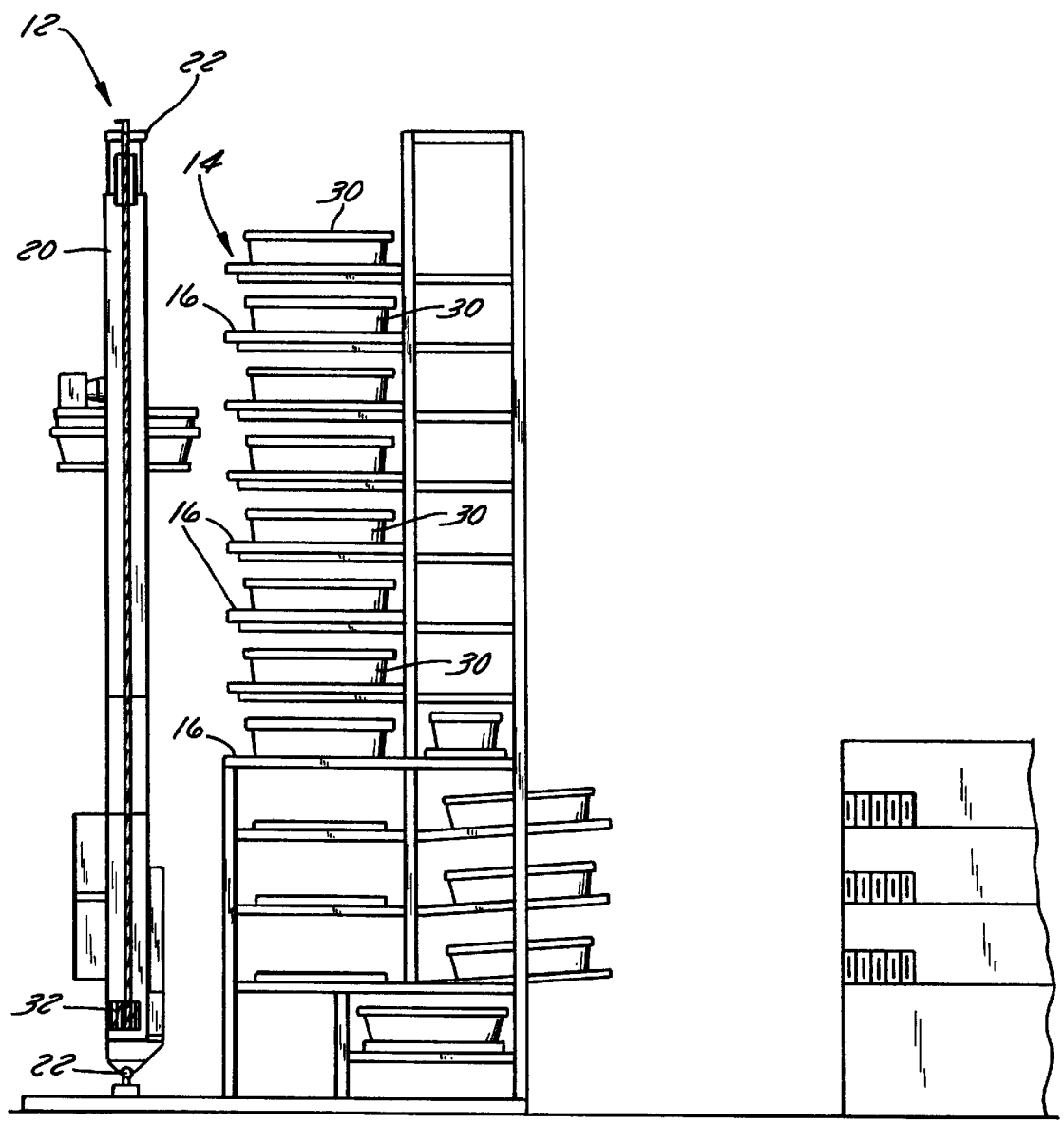
FIG. 3 is an end view of the storage and retrieval machine and staging rack shown in FIG. 2.
Figure 4:
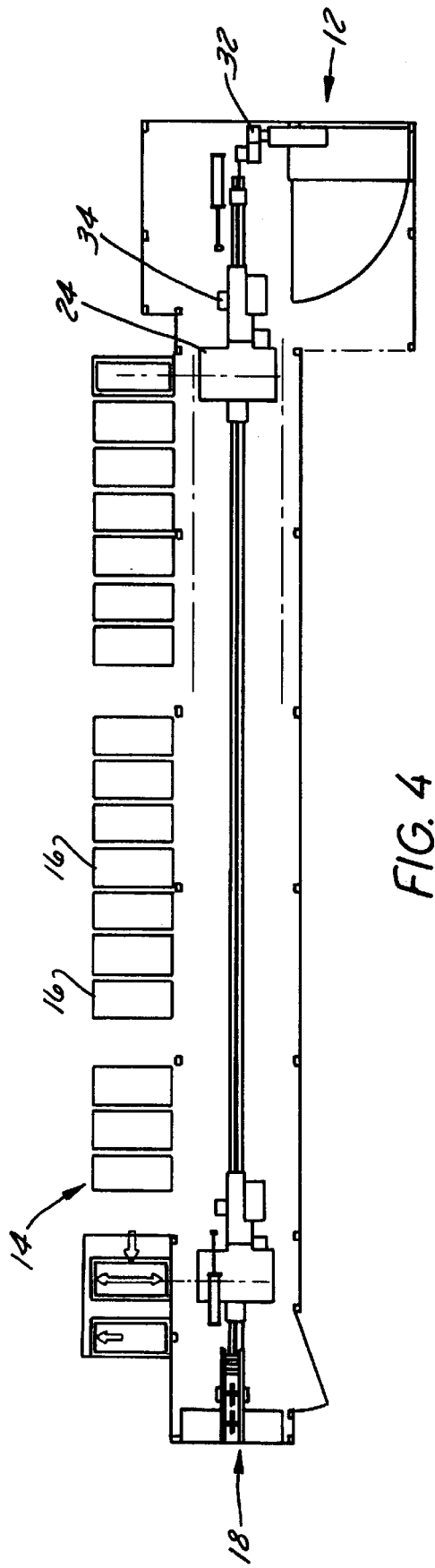
FIG. 4 is a top plan view of the storage and retrieval machine and staging rack shown in FIG. 2.
Figure 5:
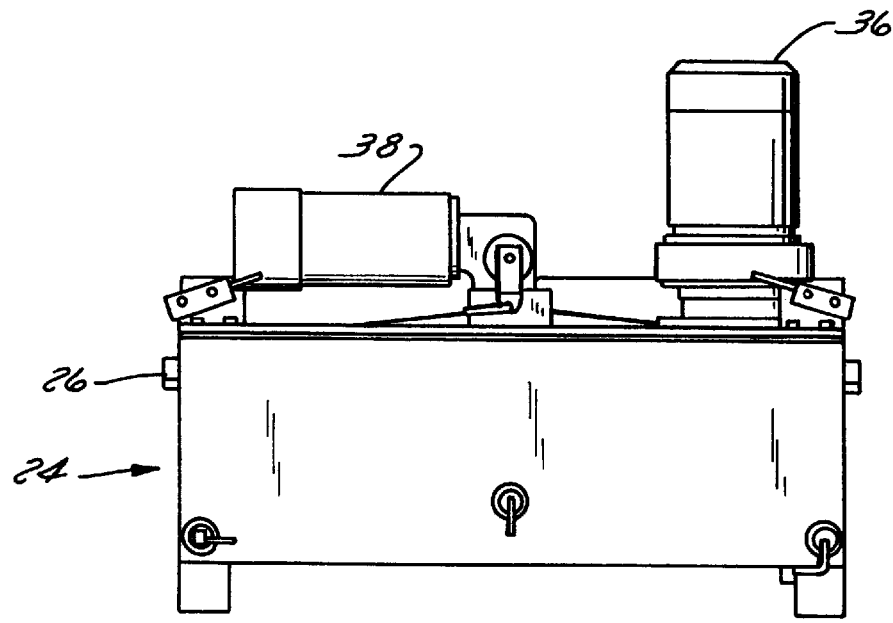
FIG. 5 is an elevational view of a carriage included in the storage and retrieval machine of FIG. 2.
Figure 6:
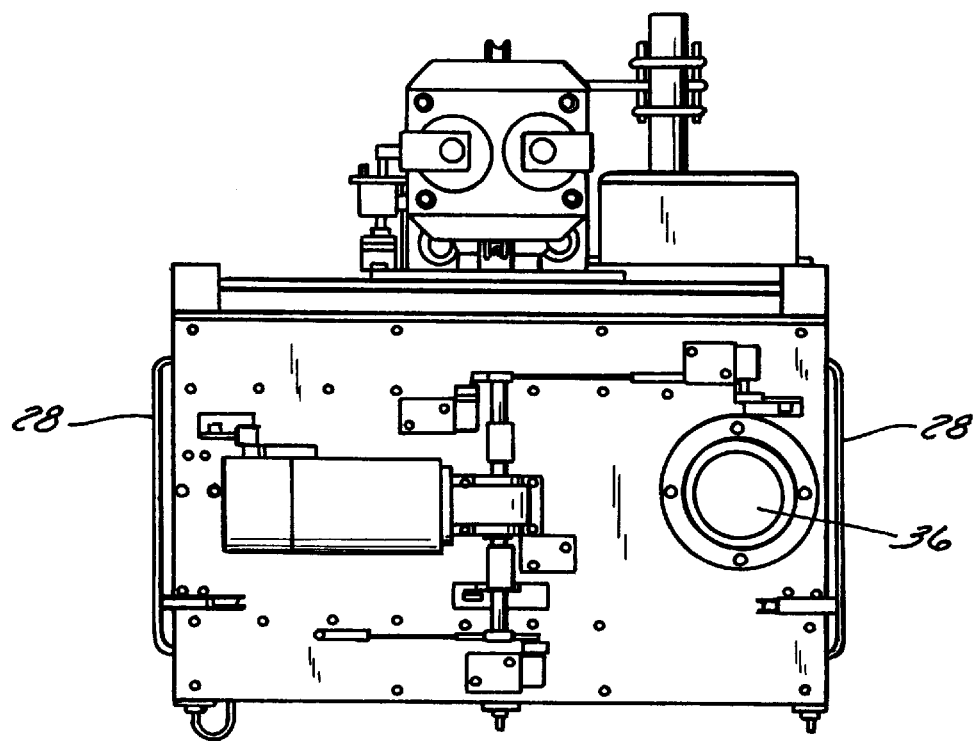
FIG. 6 is a top plan view of the shuttle shown in FIG. 5.

The storage and retrieval system 12 includes (see FIGS. 2 and 4) a staging or storage rack 14 having several bin or storage locations 16. Each bin location 16 can be considered to have a unique vertical address and horizontal address.

The storage and retrieval system 12 further includes (see FIGS. 2–6) a storage and retrieval machine (SRM) 18. The storage and retrieval machine moves loads, such as totes, or bins, to and from the staging rack, 14. Except for any differences described below, the storage and retrieval machine and staging rack are identical to those disclosed in more detail in a U.S. Pat. No. 5,405,232 "SYSTEM FOR AUTOMATICALLY STAGING LETTERS USED IN CONNECTION WITH A LETTER SORTING MACHINE", filed Apr. 2, 1993, which is incorporated herein by reference. The storage and retrieval machine 18 includes a mast 20 supported by rails 22 for movement relative to a home (or zero reference) position, along an aisle adjacent the staging rack 14, in a horizontal (aisle) direction, and a carriage 24 mounted to the mast 20 for movement along the mast 20 relative to a home (or zero reference) position in a vertical (hoist) direction. The storage and retrieval machine 18 further includes a shuttle 26, which is selectively movable laterally relative to the carriage 24, into a location 16 of the staging rack. The shuttle 26 has hoops 28, movable between a raised or up position, and a lowered or down position, for selectively engaging loads 30, such as totes, or bins. The shuttle 26 is used to deposit a load in or remove a load from a location of the staging rack 14, for example. The storage and retrieval machine 18 also includes an aisle servo motor 32 which moves the mast 20 in the horizontal direction alongside the staging rack (left to right or right to left in FIG. 2). The storage and retrieval machine 18 also includes a hoist servo motor 34 which moves the carriage 24 in a vertical direction along the mast 20 (up and down in FIG. 2). The storage and retrieval machine 18 further includes a shuttle motor 36 which moves the shuttle 26 in a direction normal to both the horizontal and vertical directions (along a Z-axis) laterally into and out of a location 16 of the staging rack 14. The storage and retrieval machine 18 further includes a shuttle hoop motor 38 which moves the movable hoops 28 for engaging a load. The storage and retrieval machine 18 also includes an Allen Bradley resolver (not shown) on the motor 32, and an Allen Bradley resolver (not shown) on the motor 34. The resolvers detect direction of rotation (direction of velocity) of the respective motors. The storage and retrieval machine 18 further includes conventional I/O components, some of which will be discussed below, such as indicator lights, photo sensors, limit switches, brakes (e.g. for preventing the carriage 24 from creeping down under the force of gravity when drive 66B is not enabled), relays (e.g. to release or engage the brakes), solenoids, etc.

The storage and retrieval machine 18 further includes conventional I/O components, including switches and sensors carried by the mast 20 and carriage 24, a vane 40 (a thin piece of opaque material) cooperating with a sensor carried by the mast 20 to define a zero reference (home) position for the mast 20 in the horizontal (aisle) direction, and a vane 42 carried by the carriage 24 and cooperating with a sensor carried by the mast 20 to define a zero reference (home) position for the carriage 24 in the vertical (hoist) direction. The storage and retrieval machine 18 further includes a magnet 44 that activates a magnetic latching proximity switch on the mast 20 to define a slowdown area 46 in the aisle direction, and a magnet 48 that activates a magnetic latching proximity switch on the carriage 24 to define a lower slowdown area 50 in the hoist direction. The application software references position in the hoist or aisle directions relative to the hoist or aisle home positions, respectively. The mast 20 and carriage 24 are sent to the respective hoist and aisle home positions periodically, for example every time the storage and retrieval machine is powered up. The mast 20 and carriage 24 always search for the respective hoist and aisle home positions from the same direction each time (from outside the slowdown areas) for consistent zero referencing. Thus, zero referencing will occur at the same edge of the vane 40 or the vane 42 every time the mast 20 or carriage 24 is sent to its home position.

The staging rack 14 has a variable number of bin locations on either or both sides of the storage and retrieval machine 18.

Figure 1:
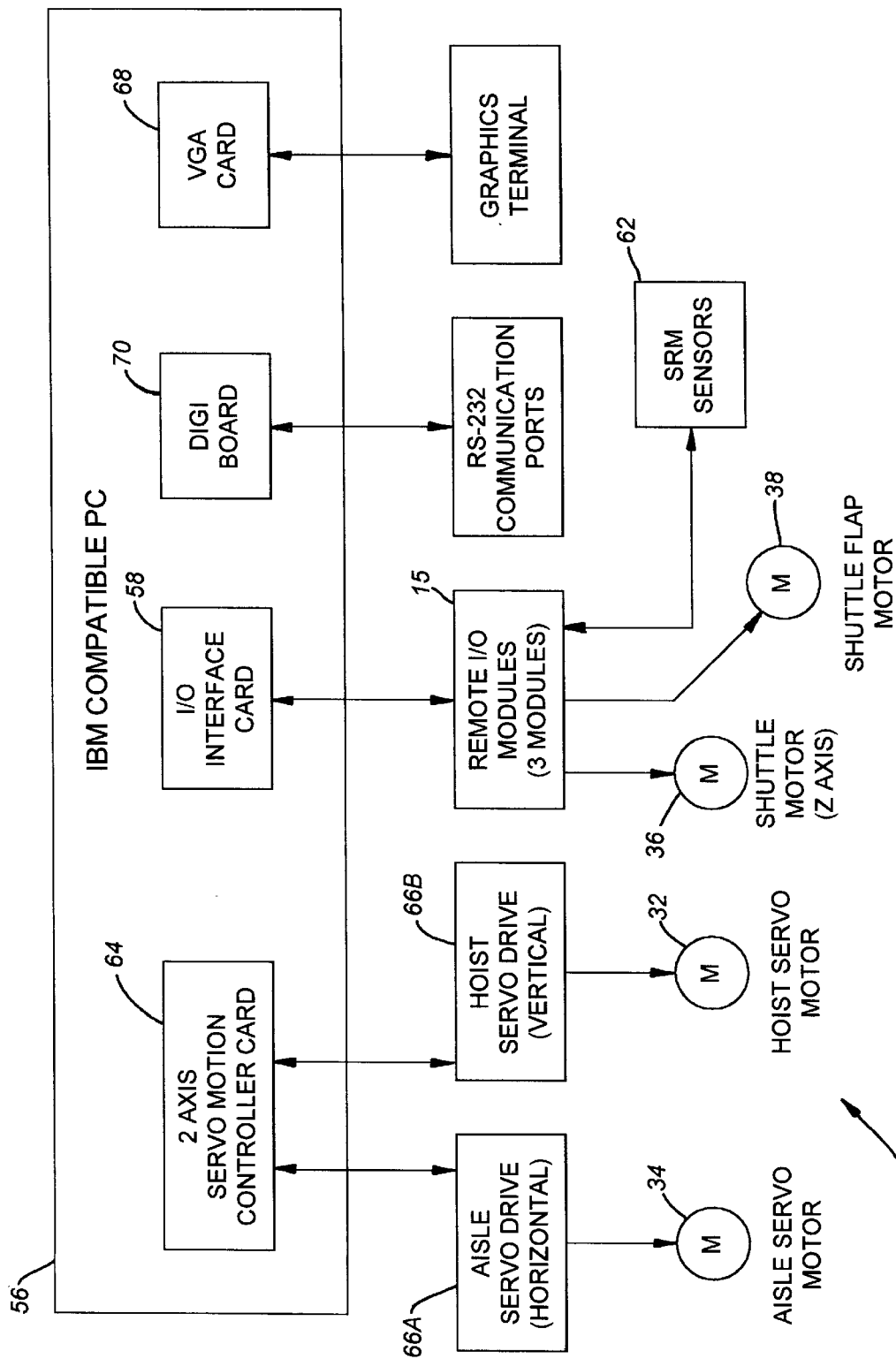
FIG. 1 is a block diagram of a storage and retrieval system embodying various features of the invention.

The storage and retrieval system 12 includes (see FIG. 1) a computer 56 which controls and monitors the SRM 18. The computer 56 includes a conventional casing or housing, and includes slots, for receiving cards, inside the housing. While various other computers could be employed, in the illustrated embodiment the computer 56 is a 100% IBM compatible computer having an INTEL 80386DX processor operating at a clock speed of 25 MHz. While other computer configurations are possible, in the illustrated embodiment, the computer 56 has a 120 Mb hard drive, a 1.44 Mb floppy drive, 8 Mb of RAM, a monitor, a standard keyboard, and a trackball or mouse. The computer 56 runs a real-time, multi-tasking UNIX® operating system called VENIX, although another real-time operating system could have been used. The computer 56 includes a backplane (high speed bus) located in the computer's housing.

The storage and retrieval system 12 further includes an I/O interface card (see FIG. 1 and FIG. 7) 58 connected to the computer 56, remote I/O modules 60 communicating with the I/O interface card 58 via a high speed bus, and I/O components 62, including SRM sensors, communicating with the I/O modules 60. While other I/O interface cards and remote I/O modules could have been utilized, in the illustrated embodiment the I/O interface card 58 utilized is a GE-Fanuc PCIM card, and the remote I/O interface modules 60 are GE Genius® I/O distributed modules. The GE-Fanuc PCIM 58 has a dedicated CPU to communicate with the GE Genius distributed I/O modules 60 via the high speed bus, which is a Genius bus in the illustrated embodiment. The I/O modules 60 are connected to I/O components 62 (see FIG. 1) such as indicator lights, photo sensors, limit switches, relays (e.g. to release brakes), solenoids, etc. Application software, which is loaded in the computer 56, and which is described below in greater detail, accesses input data and controls discrete outputs by reading and writing a 16 Kb section of dual-ported RAM which resides on the I/O interface card 58. In the illustrated embodiment, three I/O modules 60 are employed. The application software utilizes the I/O interface card 58 and the remote I/O modules 60 to control the shuttle 36 and the shuttle hoop 38 motor, as well as to monitor the other SRM sensors 62.

The storage and retrieval system 12 further includes a two axis motion control card 64 connected to the computer 56, a horizontal AC servo drive 66A hardwired to the motion control card 64 and communicating with the aisle servo motor 34, and a vertical AC servo drive 66B hardwired to the motion control card 64 and communicating with the hoist servo motor 32. The motion control card 64 includes a communication buffer. The two axis motion control card 64 is utilized to control both horizontal (aisle) motion and vertical (hoist) motion of the carriage 24 by controlling the aisle servo drive 66A and hoist servo drive 66B, respectively, thereby controlling the motors 34 and 32 associated with the aisle servo drive 66A and hoist servo drive 66B, respectively. While various other two axis motion control cards could be employed, in the illustrated embodiment the two axis servo motion control card 64 utilized is an Allen Bradley, Creonics IBM® PC two axis MCC card which is compatible with the computer 56. The Creonics MCC card 64 contains a CX2216 Dedicated Motion Peripheral Chip, and a dedicated 80C186 CPU for monitoring discrete I/O (including sensors for detecting home along the vertical axis, home along the horizontal axis, end of travel limits along the vertical axis, and end of travel limits along the horizontal axis) and controlling the CX2216 Dedicated Motion Peripheral Chip. The Allen Bradley resolvers on the motors 32 and 34 provide respective signals to the servo drives 66A and 66B. The servo drives 66A and 66B have encoder emulation boards for converting the signals from the resolvers on the motors 32 and 34 to encoder emulation signals. The CX2216 chip closes the servo position/velocity loop using these encoder emulation signals and +/−10 volt digital to analog converters wired to the horizontal and vertical servo drives 66A and 66B. While other servo drives and aisle and hoist motors could be employed, in the illustrated embodiment the horizontal and vertical servo drives 66A and 66B are Allen Bradley Bulletin 1391B-ES drives, and the aisle and hoist servo motors 34 and 32 are Allen Bradley 1326AB series motors.

The storage and retrieval system 12 further includes a super VGA card 68 (see FIG. 1) connected to the computer 56, and installed to operate in the backplane of the computer 56 to provide operator interfaces and to control the storage and retrieval machine 12.

The storage and retrieval system 12 further includes a serial interface card 70 (see FIG. 1) connected to the computer 56 and having RS-232 ports. The RS-232 ports of the serial interface card 70 are used for remote monitoring (when a user calls in via modem) and software maintenance.

In the illustrated embodiment, the serial interface card 70 is a Digi-Board PC/8.

The I/O interface card 58, the motion controller card 64, and the super VGA card 68 are installed in the backplane of the computer 56.

The motion controller card 64, the I/O interface card 58, the DIGI board 70, and the super VGA card 68 are housed in the housing of the computer 56. The computer 56, and thus the cards 64, 58, 70, and 68, is physically located separately from the mast 20 and carriage 24. No PLC or microprocessor is carried by the mast 20 or carriage 24.

The computer 56 is programmed with application software to perform various tasks. These tasks include an SRM task, an I/O task, and a machine control task, along with various other tasks. The application software is structured to allow the I/O task and the machine control task to share memory in the computer 56 (see FIG. 7). This shared memory is not to be confused with the dual-ported RAM on the I/O interface card 58 or the communication buffer on the motion controller card 64.

The SRM task is a higher level task than the machine control task, and issues messages to the machine control task. Such messages include a startup request, a shutdown request, and motion commands such as a move command, a pickup command, a deposit command, a kill command, and a home command.

Figure 7:
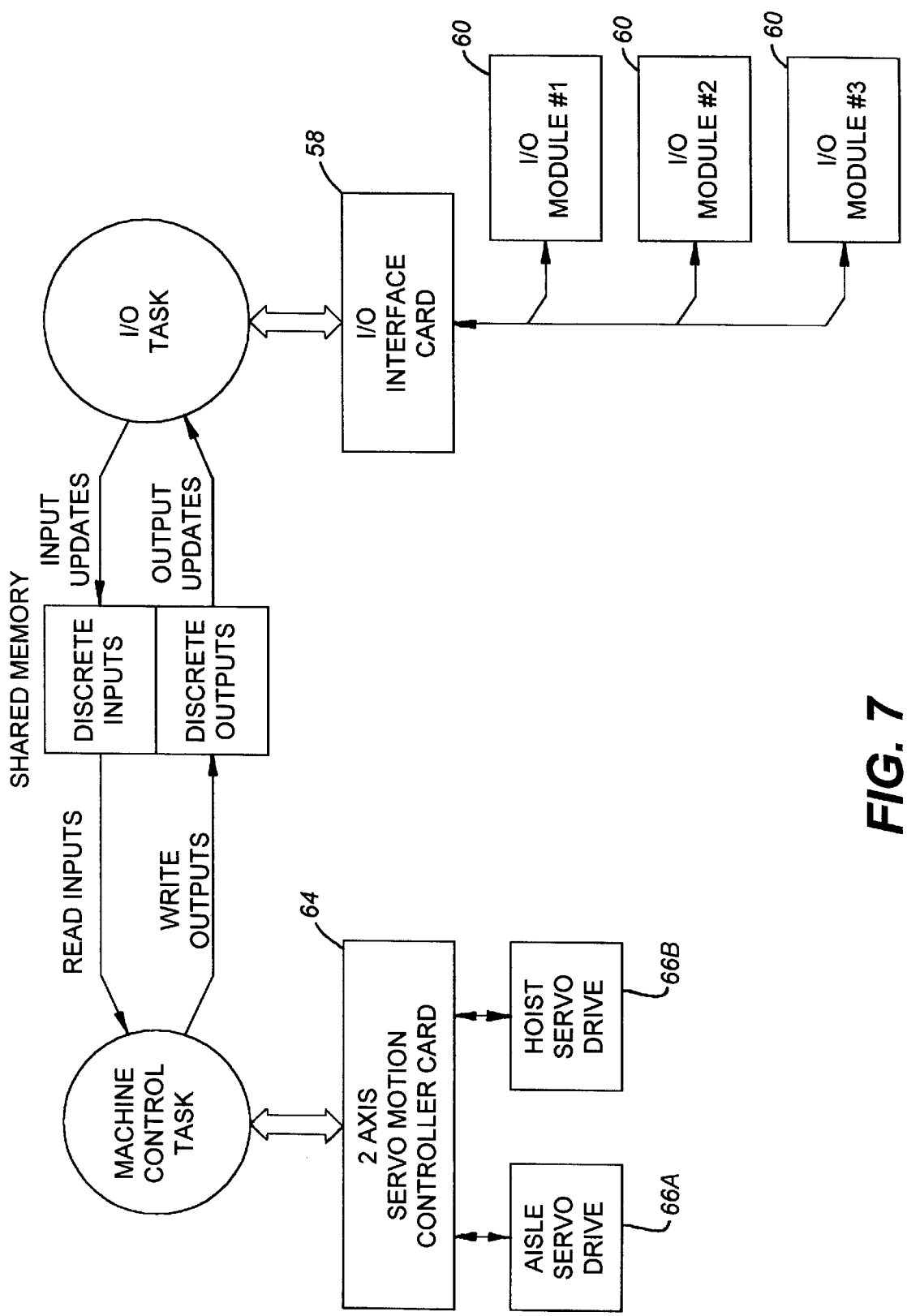
FIG. 7 is a block diagram indicating the relationship of application software and the hardware included in the storage and retrieval system of FIG. 1.

Referring now especially to FIG. 7, the I/O task reads the discrete input status from and writes discrete outputs to the I/O interface card 58 which in turn sends and receives I/O data from the remote I/O modules 60. The I/O task communicates with the I/O interface card 58 through the dual-ported RAM on the I/O card 58 and utilizes the shared memory in the computer 56 for I/O updates. Status; information from the I/O modules 60 is periodically read in from the I/O interface card 58. If the current status indicated by the I/O modules 60 is different from the previous status, the I/O task will update the shared memory and issue a software interrupt event to the machine control task to wake it up if it is not currently processing.

When the shared memory is modified and needs to be issued to the I/O interface card 58, the machine control task so informs the I/O task, via a software interrupt. Once so informed, the I/O task issues the new discrete output status to the I/O interface card 58 which then transmits the new status to the remote I/O modules 60.

The machine control task communicates with the Allen Bradley two axis servo motion control card 64 which in turn controls and monitors the aisle and hoist servo drives 66A and 66B. The machine control task communicates to the motion control card 64 through the communication buffer on the motion control card 64, and receives hardware interrupt signals from the motion control card 64. The system includes an interface between the SRM task and the machine control task, which interface defines an active command queue and a pending command queue. The machine control task has an active and pending command queue.

The Allen Bradley Creonics, two axis servo motion control card 64 has a communications interface utilizing the communication buffer on the card 64, and the communications interface includes a control register. The motion control card 64 is configured to generate a hardware interrupt when a particular motion status changes. The motion control card 64 is so configured by setting bits, using software, in the motion control card's control register This hardware interrupt will cause a software interrupt to be issued to the machine control task. The machine control task will then be awakened, if it is not currently processing an event.

During initialization of the machine control task, the motion control card 64 is requested to initiate a hardware interrupt when either axis becomes busy (moves) or if a fault occurs. Aster the machine control task is informed that a particular axis became busy, it will request that the motion control card 64 initiate an interrupt when that axis becomes idle (done or faulted).

Figure 8:
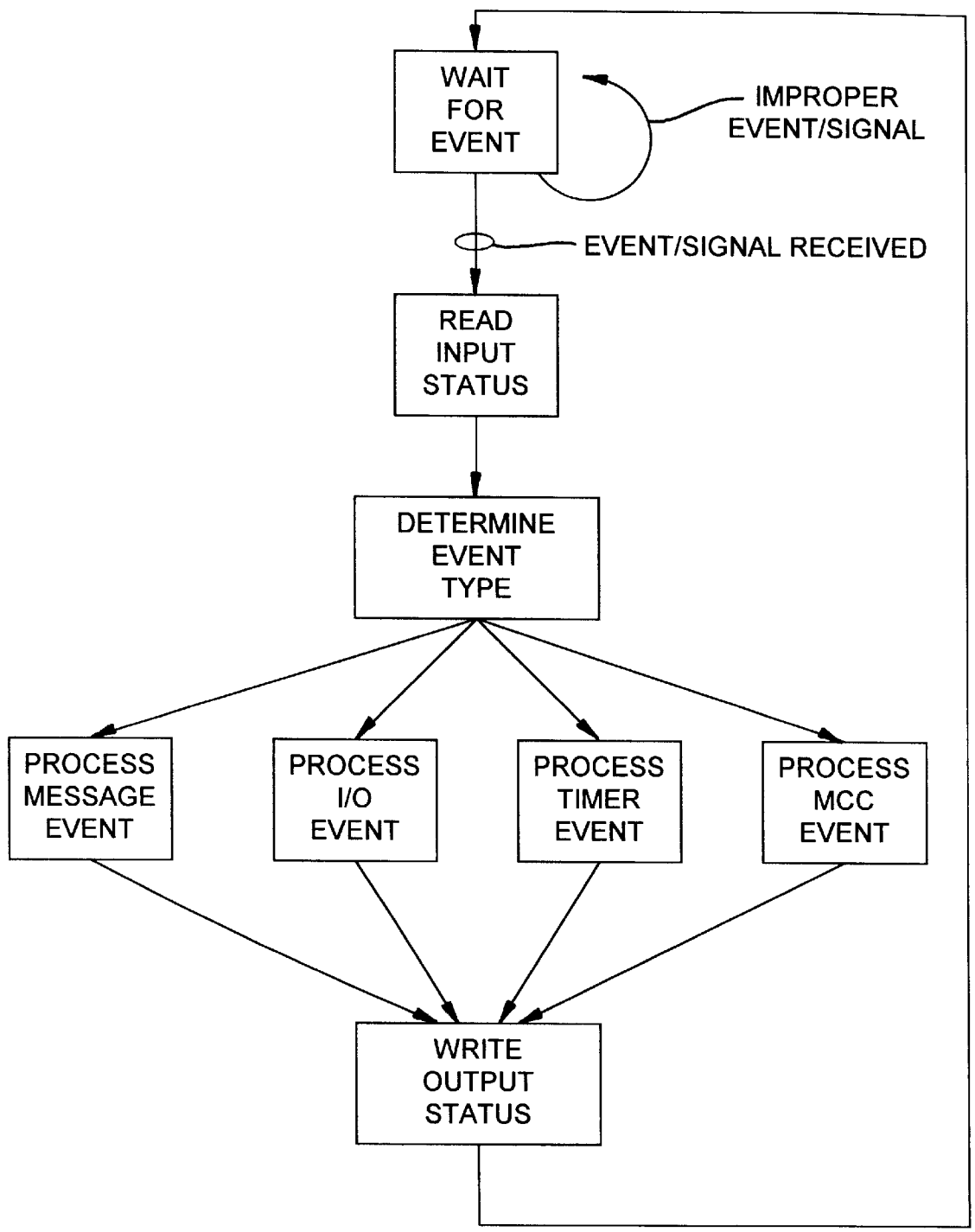
FIG. 8 is a block diagram for a machine control task implemented by a computer included in the storage and retrieval system of FIG. 1.

Referring now especially to FIG. 8, after the machine control task has been initialized (first run), it suspends execution until a software interrupt is received indicating that a particular event type has occured. Once an event occurs, a subroutine is executed and prior to determining the event type, the current I/O status is read in from shared memory, After the I/O status is read, the event type is determined. The machine control task recognizes and acts upon the following event types:

1. Message events

A message from another task within the system (such as the SRM task) has been received by the machine control task.

2. I/O Events

These events are generated by the I/O task whenever the I/0 task determines that a discrete input status has changed.

3. Timer Event

These events are generated when real-time timers (provided by the operating system) have expired, For example, if a motion is not completed within a predetermined time, as measured by a real-time timer, a fault is generated.

4. MCr Events

MCC events are generated when hardware interrupts are received from the two axis motion control card 64.

After the event type is determined, appropriate subroutine (s) will be invoked. After the event is processed, the machine control task's current output table is written to the I/O task's shared memory table, and the machine control task informs the I/O task that the output status has changed so that the I/O task can update the real world outputs.

Figure 9:
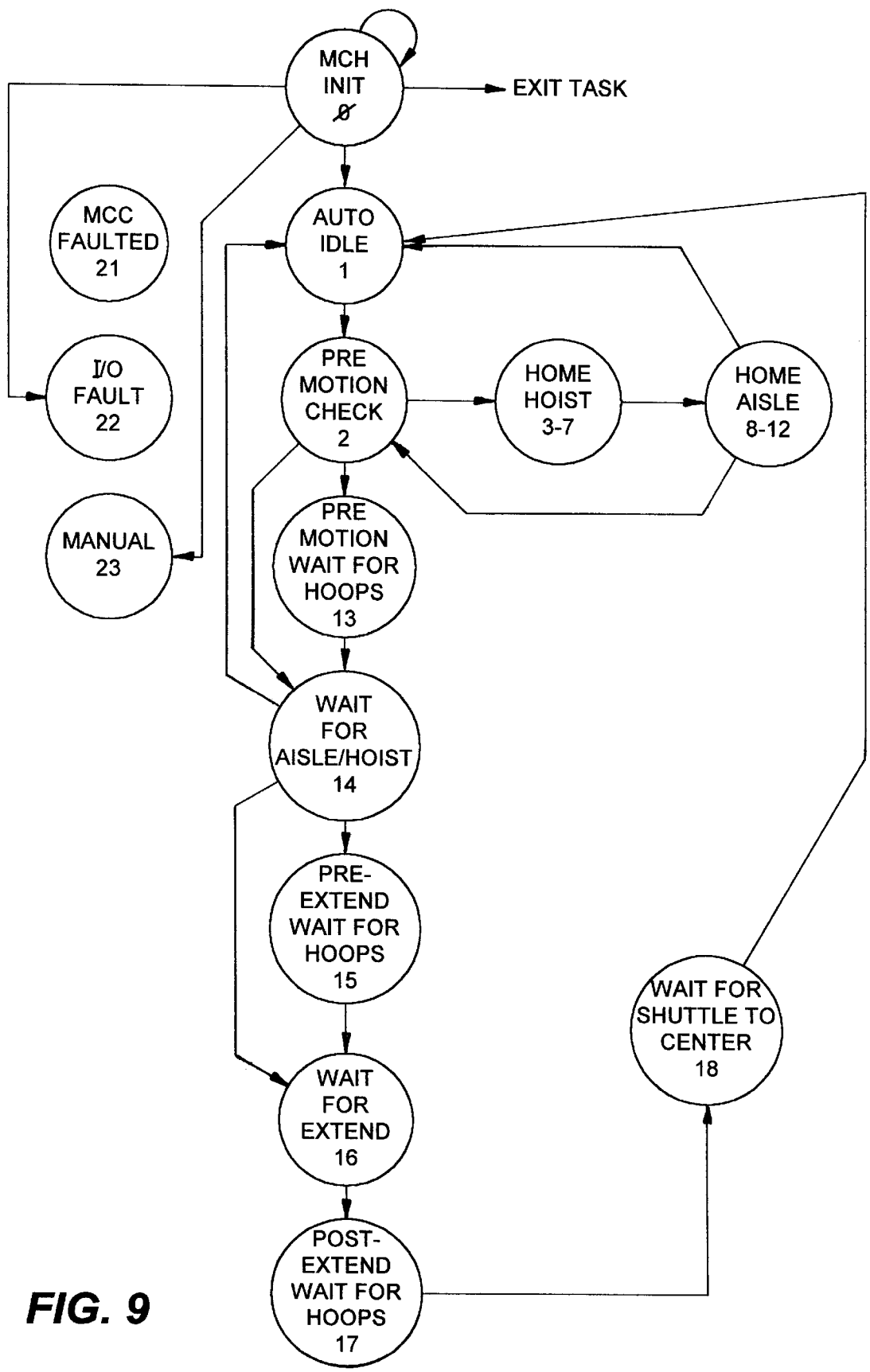
FIG. 9 is a state diagram of the control software utilized by the machine control task.
Figure 10:
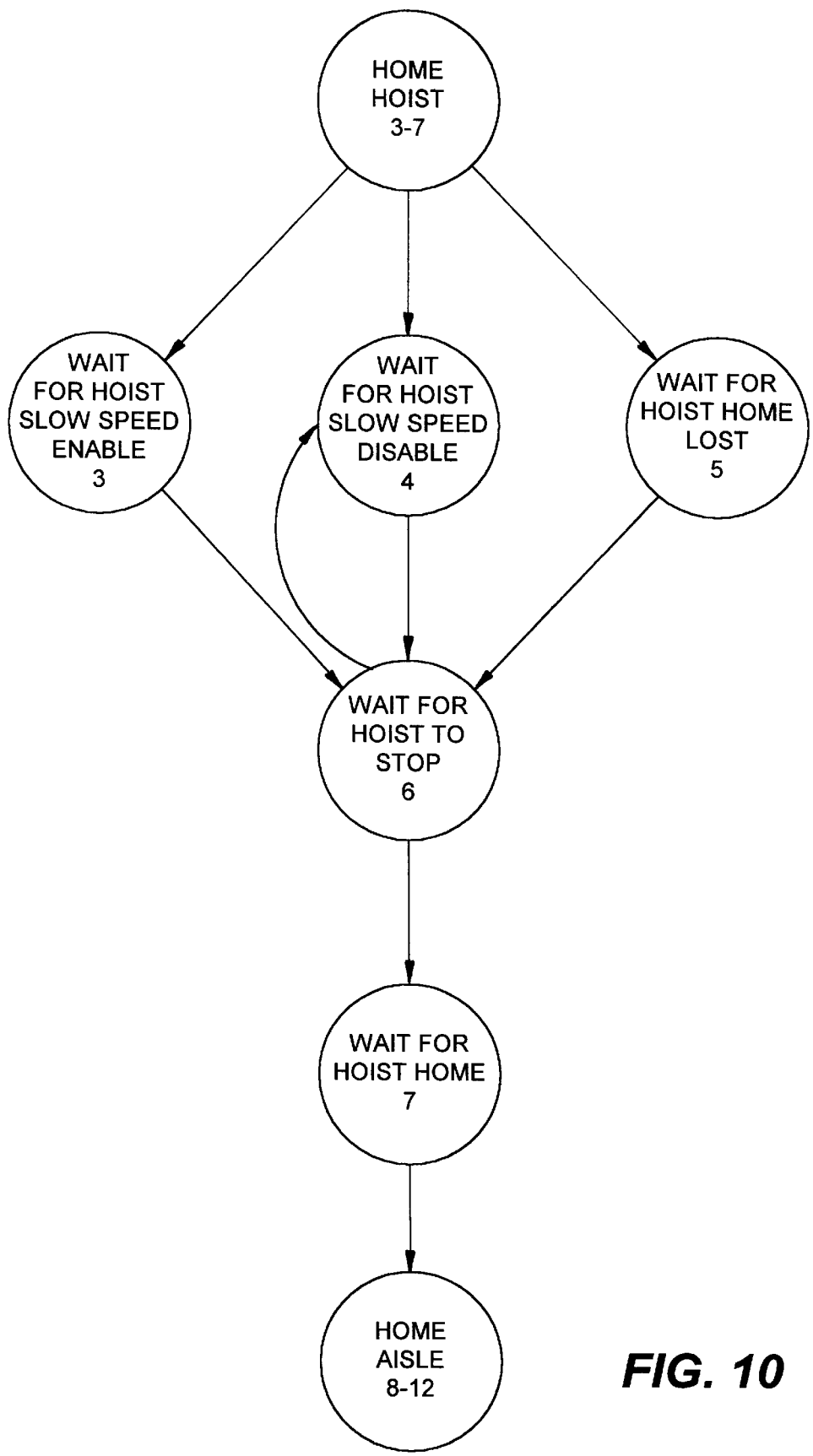
FIG. 10 is a state diagram of the software utilized to home the hoist motion.
Figure 11:
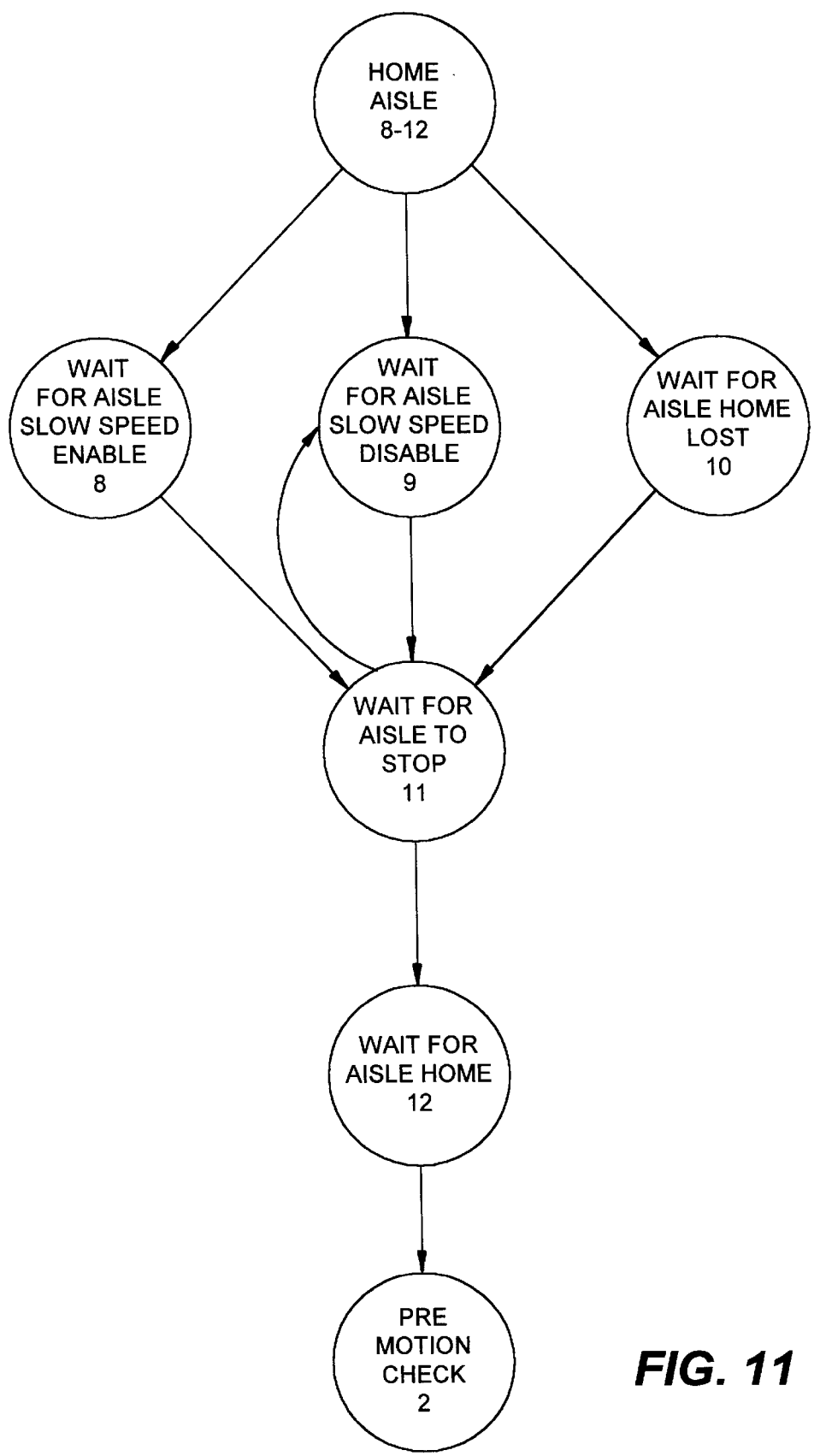
FIG. 11 is a state diagram of the software utilized to home the aisle motion.

Referring now to FIGS. 9–11, FIGS. 9–11 are general state diagrams of the program sequence or steps utilized by the machine control task.

The motion control software is event driven to provide maximum system response. How the software responds to a particular event is dependent upon its current machine state. The machine states utilized to track the storage and retrieval machine's current operation and/or motion sequence are as follows:

State 0—Initialize machine control task

This is the first machine state that is entered when the motion control software is run. All of the motion control variables are set to default values and the system's configuration files are read.

During the startup and initialization the machine control task sets its machine state to Machine Initialization (State 0).

If the initialization was successful, the machine control task remains in this machine state (State 0) until it receives the startup message request from the higher level SRM task.

After the machine control task receives the startup message request from the SRM task, the status of the motion control card 64 and the I/O interface card 58 are verified. If both cards have proper statuses, the inputs are checked for the current mode of operation and the following action is taken.

If there is no problem with either of the cards 58 or 64, unless operation in a maintenance mode is selected, the machine control task sets its machine state to Automatic Idle (State 1).

If there is a problem with the motion control card 64, the machine control task sets its machine state to MCC Faulted (State 21). The machine control task remains in this state until another event occurs and the card 64 is in proper status.

If the I/O communication status is determined to be improper, the machine control task sets its state to I/O Fault (State 22) and it remains in State 22 until another event occurs and the I/O communications status is proper.

State 1—Automatic-Idle

When the machine control task is in this state, the storage and retrieval machine 18 is idle (no motion) and it does not have any pending motion commands.

State 2—Pre-Motion Check

This state is entered after the machine control task receives a move, pickup or deposit motion command. The command is validated and the machine (I/O) sensors are verified. If the command is valid and the sensors indicate that safe movement is possible, motion is enabled. Otherwise, a fault is generated.

State 3—Hoist Home, Wait for Hoist Slow Speed Enable

This state is entered when the hoist carriage 24 is in the lower slowdown area 50 and a Hoist Home input is not present. The machine control task initiates a hoist carriage move in the up direction to leave the slowdown area 50.

State 4—Hoist Home, Wait for Hoist Slow Speed Disable

This state is entered when the hoist carriage 24 is not in the lower slowdown area 50. The machine control task initiates motion of the carriage 24 in the down direction until the carriage 24 enters the lower slowdown area 50. After the carriage 24 enters the slowdown area 50, the machine control task enters the next appropriate state.

State 5—Hoist Home, Wait for Hoist Home Lost

This state is entered when the hoist carriage 24 is in the lower slowdown area 50 and a Hoist Home input is present. Hoist motion is initiated in the up direction until the Hoist Home input changes state. After this occurs, the next machine state is entered.

State 6—Hoist Home, Wait for Hoist to Stop

This state is entered from the previous Hoist Home states (States 3–5) when hoist motion is discontinued. This state is used to wait for the two axis motion control card 64 to indicate that the hoist carriage 24 is idle. After the motion control card 64 indicates that the hoist is idle, the machine control task enters into the next appropriate machine state.

State 7—Hoist Home, Wait for Hoist to Home

This state is entered after the machine control task issues a home command to the motion control card 64 for the hoist axis. The motion control software is waiting for the motion control card 64 to indicate that the home command has been completely executed.

State 8—Aisle Home, Wait for Aisle Slow Speeds Enable

This state is entered when the mast 20 is in a front slowdown area 46 and no Aisle Home input is present. Aisle motion will be initiated in the reverse direction until the mast 20 exits the slowdown area. After the machine control task detects the mast 20 has left the slowdown area 46, the machine control task enters the next appropriate state.

State 9—Aisle Home, Wait for Aisle Slow Speed Disable

This state is entered when the mast 20 is not in the front slowdown area 46. Aisle forward motion of the mast 20 is initiated until the mast 20 enters the slowdown area 46. After the mast 20 is in the slowdown area 46, the machine control task stops the aisle motion and enters into the next appropriate aisle home state.

State 10—Aisle Home, Wait for Aisle Home Lost

This Aisle Home state is entered when the mast 20 is in the front slowdown area 46 and the Aisle Home input is present. The mast 20 is moved in the reverse direction. After the Home input is reset, motion is stopped and the machine control task enters into the next appropriate machine state.

State 11—Aisle Home, Wait for Aisle to Stop

This state is entered from the previous Aisle Home states when aisle motion is discontinued. This state is used to wait for an event from the two axis motion control card 64 to indicate that the mast 20 is idle. When the machine control task is informed that the aisle has become idle, the next appropriate machine state is entered.

State 12—Aisle Home, Wait for Aisle to Home

This state is entered after the machine control task issues a home command to the motion control card requesting horizontal movement of the mast 20. When the machine control task is in this state, the machine control task waits for the machine control card 64 to indicate that the home command has been completed. After the home command has been completed, the machine control task changes states.

State 13—Pre-Motion Wait for Shuttle Hoops to Lower

This state is only entered if there is a load being carried by the carriage 24 and the shuttle hoops 28 are raised. The machine control task remains in this state until the shuttle hoops 28 are lowered.

State 14—Wait for Aisle or Hoist Motion to Complete

This state is entered whenever the machine control task issues a move command to the motion control card 64. The machine control task remains in this state until the motion control card 64 indicates that both the hoist axis and the aisle axis are idle.

State 15—Pre-Extend, Wait for the Shuttle Hoops

This state is only entered when a pickup or deposit command is being executed and the hoops 28 are not in the proper position to extend the shuttle 26 laterally away from the carriage 24. The machine control task remains in this state until the hoops 28 are in the proper position for extension of the shuttle 26.

State 16—Wait for the Shuttle to Extend

This state is entered after the machine control task extends the shuttle 26 laterally from the carriage 24. The machine control task remains in this state until the shuttle 26 is completely extended.

State 17—Post-Extend, Wait for the Shuttle Hoops

This state is entered when the shuttle 26 is extended and the machine control task is either raising or lowering the shuttle hoops in order to deposit or pickup a load. The machine control task remains in this state until shuttle hoop motion is complete.

State 18—Wait for the Shuttle to Center

This state is only entered when a pickup or deposit command is being executed and the shuttle needs to be retracted (centered) The machine control task enters another state after the shuttle is retracted (centered) and a motion settle time has expired.

State 20—Wait for the SRM to Stop

This state is entered when, while there is motion with respect to the storage and retrieval machine 18, the machine control task detects a fault condition or the machine control task receives a Kill command from the SRM task.

State 21—MCC Faulted

This state is entered if a communication failure is detected between the computer and the two axis motion control card. The machine control task remains in this state until communications can be re-established.

State 22—I/O Fault

This state is entered when a communication failure is detected by the I/O task, between the computer 56 and the I/O interface card 58, or with one of the remote I/O modules 60. The machine control task remains in this state until it receives notice from the I/O task that all of the I/O communications are proper.

State 23—Maintenance Mode

This state is entered if manual control of the storage and retrieval machine 18 is selected by a human operator.

An example of operation of the storage and retrieval system 18 will now be given.

Assume that the storage and retrieval machine 18 is idle. When the aisle axis became idle (when the mast 20 stopped moving, along the rails 22, in the horizontal or aisle direction), the machine control task would have received an interrupt from the motion control card 64, and would have rescheduled the motion control card 64 to give an interrupt to the motion control task when the aisle axis becomes busy. When the hoist axis became idle (when the carriage 24 stopped moving, along the mast 20, in the vertical or hoist direction) the machine control task would have received an interrupt from the motion control card 64, and would have rescheduled the motion control card 64 to give an interrupt to the motion control task when the hoist axis becomes busy. The machine control task is now in State 1 waiting for a motion control command (e.g. home, move, pickup or deposit) to be issued by the SRM task.

Assume now that the SRM task issues a move command to the machine control task. The machine control task checks if its pending command queue is empty. If the pending command queue is empty, the machine control task copies the motion command (the move command in this example) into its pending command queue and indicates that the pending command queue is occupied. The machine control task then checks if the configuration of the rack 14 has changed. If the configuration of the rack 14 has changed, the new rack configuration is read in. After the rack configuration is checked, the machine control task checks if its active command queue is empty. In this example, the active command queue is empty. After the active command queue is determined to be empty, the pending move command is copied into the active command queue. The machine control task then issues a message to the SRM task to indicate that the pending command has been transferred to the active command queue and is being processed/executed.

The machine control task the n proceeds to State 2. In State 2, I/O status is checked. If safe movement is not possible, a fault is generated, and the machine control task proceeds to State 22. If the command type is not a home command (in this example the command is not a home command), the machine control task calls a subroutine that determines whether the command requested movement to a valid location.

If the command issued by the SRM task is a pickup command (not the case in this example), the current load status of the carriage is checked. If a load 30 is already present on the carriage 24, a fault is issued to indicate that a load is present prior to a pickup command.

If the command issued by the SRM task is a deposit command (not the case in this example), the load status is checked. If a load 30 is not present, a fault is generated.

If the load status is proper and no other faults have occurred, the current status of the hoops 28 is checked.

If the hoops 28 are in the up position and a load 30 is supposed to be supported by the carriage 24, a subroutine is called to move the hoops 28 to their lower position (State 13 will be entered temporarily).

If the load status is proper and the shuttle hoops are in the proper position, a subroutine is invoked that checks if the aisle and hoist drives 66A and 66B are enabled and if the brakes are released. If the drives are not enabled, this subroutine enables them. Once they become enabled and their brakes are released, this subroutine is again executed.

If both drives 66A and 66B are enabled and their brakes are released, a subroutine checks if movement along the aisle or the hoist needs to be homed.

If homing of the aisle or the hoist is not required (homing will not be required in this example), the machine state is set to Wait for the Aisle and/or Hoist Motion to Complete (State 14) and a subroutine is invoked to send appropriate MCC move commands to the motion control card 64 to move the carriage in the aisle and hoist directions.

The motion control card 64 issues an interrupt to the machine control task when the aisle axis becomes busy. The machine control task then reschedules the motion control card 64 to issue an interrupt to the machine control task when the aisle axis becomes idle. The motion control card 64 issues an interrupt to the machine control task when the hoist axis becomes busy. The machine control task then reschedules the motion control card 64 to issue an interrupt to the machine control task when the hoist axis becomes idle.

When the aisle axis becomes idle, the motion control card 64 issues an interrupt to the machine control task and reschedules the motion control card 64 to issue an interrupt when the aisle axis becomes busy. When the hoist axis becomes idle, the motion control card 64 issues an interrupt to the machine control task and reschedules the motion control card 64 to issue an interrupt when the hoist axis becomes busy. Upon receipt of an interrupt, the machine control task calls a subroutine to determine the event type.

If the interrupt is caused by either of the aisle and hoist axes becoming idle, the machine control task remembers which axis has become idle, and waits for the other of the aisle and hoist axes to become idle.

When the other of the aisle and hoist axes becomes idle, the machine control task calls a subroutine to read the position of the carriage 24 along the aisle axis and along the hoist axis to make sure that the carriage 24 is at the desired location, within tolerance in the aisle or hoist directions. Assuming that the carriage 24 is at the desired location, the machine control task checks the type of the current command, and takes action depending on the type of command.

If the command is a pickup or deposit command (not the case in this example), the machine control task will make sure the hoops 28 are in a proper position, will call a subroutine to extend the shuttle 26 (State 16 will be entered temporarily), will cause the hoops 28 to move to pick up or deposit a load, and will cause the shuttle 26 to retract.

If the command is a move command (as is the case in this example), the machine control task informs the SRM task that the command has been completed, leaves State 14, sets the machine state to Auto-Idle (State 1), and rechecks the pending command queue.

Thus, a storage and retrieval system has been disclosed wherein a storage and retrieval machine is controlled by a computer having a real time operating system and being programmed to operate in an event driven fashion. Efficiency is increased, and response time is decreased.

No PLC is required to be carried by the mast of the storage and retrieval machine and, thus, weight is reduced.

While a preferred embodiment of the invention has been disclosed, by way of example, various obvious modifications will become apparent to those of ordinary skill in the art.

We claim:

1. A method of controlling a storage and retrieval machine in event driven fashion, the method comprising:

(A) providing said storage and retrieval machine with a horizontally movable base, a vertically movable carriage, and a microprocessor-based control system that controls movement of said base and said carriage of storage and retrieval machine, said microprocessor-based control system including a motion controller, a machine control task, an input/output interface, an input/output task, and at least one microprocessor that executes said machine control task and said input/output task;

(B) issuing a plurality of interrupts to said machine control task in response to events which occur in an operating environment of said storage and retrieval machine, at least some of plurality of interrupts being issued by said motion controller, and at least some of plurality of interrupts being issued by said input/output task in response to input signals from sensors received at said input/output interface; and (C) responding to said interrupts, said responding step including the steps of
   (1) receiving said plurality of interrupts at said machine control task, and
   (2) executing at least one subroutine in response to the reception of each interrupt, said execution of said subroutines controlling movement of said base and said carriage of said storage and retrieval machine, and said executing step including the step of providing information to said motion controller which enables said motion controller to cooperate with base and hoist servo motors of said storage and retrieval machine to deliver said carriage to a next rack location;

wherein movement of said base and said carriage of said storage and retrieval machine (1) is substantially entirely controlled by issuing and responding to said interrupts in steps (B) and (C) as different events occur in said operating environment that cause said interrupts to be issued and (2) is controlled in a manner which is substantially free of polling by said machine control task of said input/output interface and said motion controller for status information.

2. The method according to claim 1, wherein said step of issuing a plurality of interrupts further comprises the steps of issuing a first interrupt when one of said base and carriage begins movement, said first interrupt issuing step being performed by said motion controller, and said first interrupt being one of the plurality of interrupts issued by said motion controller; and issuing a second interrupt when said one of said base and carriage stops movement, said second interrupt issuing step being performed by said motion controller, and said second interrupt being another one of the plurality of interrupts issued by said motion controller.

3. The method according to claim 2, wherein the steps of issuing said first and second interrupts each comprise the steps of
   (a) issuing a hardware interrupt to said at least one microprocessor that executes said machine control task, the issuing step (a) being performed by said motion controller,
   (b) issuing a software interrupt to said machine control task, said software interrupt being issued in response to said hardware interrupt.

4. The method according to claim 1, wherein
said step of issuing a plurality of interrupts includes the step of issuing a timer interrupt, said timer interrupt being issued in response to an expiration of a timer, said expiration of said timer indicating that a storage and retrieval machine movement has not been completed within a predetermined time; and wherein
said step of responding to said interrupts includes the step of responding to said timer interrupt.

5. The method according to claim 1, wherein
said step of issuing a plurality of interrupts includes the step of issuing a message interrupt, said message interrupt being issued in response to a communication of a message to said machine control task; and wherein
said step of responding to said interrupts includes the step of responding to said message interrupt.

6. The method according to claim 1, wherein said machine control task is suspended except when said machine control task is responding to an interrupt.

7. The method according to claim 1, wherein said sensor is one of a photosensor, a limit switch and a proximity switch.

8. The method according to claim 1, wherein the responding step (D) comprises the step of causing said storage and retrieval machine to deliver said carriage to a next rack location.

9. The method according to claim 8, wherein the step of causing said storage and retrieval machine to deliver said carriage to said next rack location comprises the step of controlling (1) a base servo motor that drives movement of said base and (2) a hoist servo motor that drives movement of said hoist using said motion controller.

10. A storage and retrieval machine comprising:
(A) a base, said base being movable in a horizontal direction;
(B) a base servo drive, said base servo drive being coupled to a base motor and to said base;
(C) a carriage, said carriage being movable in a vertical direction;
(D) a hoist servo drive, said base hoist drive being coupled to a hoist motor and to said carriage;
(E) a plurality of interrupt devices, including
   (1) an input/output interface, said input/output interface being coupled to a discrete sensor, and said input/output interface generating an input/output interrupt in response to a change in a state of said discrete sensor,
   (2) a motion controller, said motion controller being coupled to said base servo drive and said hoist servo drive, and said motion controller generating a motion control interrupt in response to an event relating to at least one of said base and hoist motors, and
   (3) a timer, said timer issuing a timer interrupt in response to an expiration of a predetermined time period, said expiration indicating that a storage and retrieval machine movement has not been completed within said predetermined time period;
(F) a machine control task executed by at least one microprocessor, said machine control task controlling movement of said base in said horizontal direction and of said carriage in said vertical direction, said machine control task including
   (1) a plurality of interrupt inputs coupled to said plurality of interrupt devices means thereby permitting said machine control task to receive said input/output interrupt, said motion control interrupt, and said timer interrupt,
   (2) a plurality of interrupt service routines including
      (a) an input/output interrupt service routine which is executed in response to a reception of said input/output interrupt by said machine control task, (b) a motion control interrupt service routine which is executed in response to a reception of said motion control interrupt by said machine control task, (c) a timer interrupt service routine which is executed in response to a reception of said timer interrupt by said machine control task, and wherein said movement of said base in said horizontal direction and said movement of said carriage in said vertical direction (1) is substantially entirely controlled by the execution of said plurality of interrupt service routines and (2) is controlled in a manner which is substantially free of polling by said machine control task of said input/output interface and said motion controller for status information.

11. The storage and retrieval machine according to claim 10, wherein said plurality of interrupt devices further includes means for generating a message interrupt, said generating means generating said message interrupt in response to a communication of a message to said machine control task; wherein said plurality of interrupt inputs further permits said machine control task to receive said message interrupt; and wherein said plurality of interrupt service routines further includes a message interrupt service routine which is executed in response to a reception of a message interrupt by said machine control task.

12. The storage and retrieval machine according to claim 10, wherein said machine control task further includes a pending command queue, means for placing a command in said pending command queue, said command being placed in said command queue in response to one of said input/output interrupt, said motion control interrupt, and said timer interrupt, and wherein said machine control task is not executed when there is no command in said pending command queue.

13. The storage and retrieval machine according to claim 10, wherein said microprocessor has a real time operating system.

14. The storage and retrieval machine according to claim 10, wherein said machine control task is suspended except when said machine control task is responding to an interrupt.

15. The storage and retrieval machine according to claim 10, wherein said plurality of interrupt service routines use said motion controller to control movement of said carriage of said storage and retrieval machine to a next rack location.

16. A method of controlling a storage and retrieval machine in event driven fashion, the method comprising:

(A) providing said storage and retrieval machine with a horizontally movable base, a vertically movable carriage, and a microprocessor-based control system, said microprocessor-based control system further including a motion controller, a machine control task, an input/output interface, an input/output task, a memory that is accessible by both said machine control task and said input/output task, and at least one microprocessor that executes said machine control task and said input/output task;

(B) determining that an interrupt has been issued to said machine control task, said interrupt indicating that an event has occurred in the operating environment of said storage and retrieval machine;

(C) determining an event-type of the event that occurred in the operating environment of said storage and retrieval machine;

(D) responding to the event that occurred in the operating environment of said storage and retrieval machine, including updating output devices by transmitting output information to said output devices using said input/output interface and said input/output task, the updating step including the steps of (1) transmitting said output information from said machine control task to said memory that is accessible by both said machine control task and said input/output task, (2) issuing a machine control interrupt to said input/output task, the issuing step (D)(2) being performed by said machine control task;

(3) receiving output information from said memory that is accessible by both said machine control task and said input/output task, the receiving step (D)(3) being performed by said input/output task, (4) transmitting said output information from said input/output task to said input/output interface, and (5) transmitting said output information from said input/output interface to an output device;

(E) wherein said machine control task responds to input events and to motion control events;

(F) wherein said input events each include the following steps, which are performed by said input/output interface and said input/output task, (1) receiving input information from a sensor at said input/output interface, (2) transmitting said input information from said input/output interface to said input/output task, (3) transmitting said input information from said input/output task to said memory that is accessible by both said machine control task and said input/output task, and (4) issuing an input interrupt to said machine control task, the issuing step (F)(4) being performed by said input/output task in response to determining that input information has changed;

(G) wherein said motion control events each include the step of issuing a motion control interrupt to said machine control task, the issuing step (G) being performed by said motion controller at least when motion of said base is initiated, when motion of said carriage is initiated, when motion of said base is terminated, and when motion of said carriage is terminated.

17. The method according to claim 16, wherein said input interrupt and said machine control interrupt are both software interrupts.

18. The method according to claim 16, wherein the step of issuing a motion control interrupt comprises the steps of (a) issuing a hardware interrupt to said microprocessor that executes said machine control task, the issuing step (a) being performed by said motion controller, (b) issuing a software interrupt to said machine control task, said software interrupt being issued in response to said hardware interrupt.

19. The method according to claim 16, wherein said machine control task is suspended except when said machine control task is responding to an interrupt.

20. The method according to claim 16, wherein said sensor is one of a photosensor, a limit switch and a proximity switch.

21. The method according to claim 16, wherein the responding step (D) comprises the step of causing said storage and retrieval machine to deliver said carriage to a next rack location.

22. The method according to claim 21, wherein the step of causing said storage and retrieval machine to deliver said carriage to said next rack location comprises the step of controlling (1) a base servo motor that drives movement of said base and (2) a hoist servo motor that drives movement of said hoist using said motion controller.

* * * * *